US008717182B1

(12) United States Patent
Brashears et al.

(10) Patent No.: US 8,717,182 B1
(45) Date of Patent: May 6, 2014

(54) MECHANISM AND METHOD TO IMPLEMENT A READER MECHANISM FOR A CONTAINER-BASED MONITOR OF A CONSUMABLE PRODUCT

(75) Inventors: Richard Vaughn Brashears, San Jose, CA (US); Robert L. Brashears, San Jose, CA (US); Greg C. Buchner, Los Altos, CA (US); David M. Cross, San Jose, CA (US); Eric M. Nequist, Saratoga, CA (US)

(73) Assignee: Solbrae, Inc., San Jose, CA (US)

( * ) Notice: Subject to any disclaimer, the term of this patent is extended or adjusted under 35 U.S.C. 154(b) by 114 days.

(21) Appl. No.: 13/196,858

(22) Filed: Aug. 2, 2011

(51) Int. Cl.
G08B 21/00 (2006.01)
H04Q 5/22 (2006.01)

(52) U.S. Cl.
USPC ........ 340/603; 340/10.1; 340/572.1; 235/375

(58) Field of Classification Search
USPC ........... 340/603, 572.1–572.8, 10.1; 235/375, 235/385
See application file for complete search history.

(56) References Cited

U.S. PATENT DOCUMENTS

| | | | | |
|---|---|---|---|---|
| 4,057,029 A * | 11/1977 | Seiter | | 374/106 |
| 4,681,611 A | 7/1987 | Bohner | | |
| 4,930,902 A | 6/1990 | Yata et al. | | |
| 6,264,049 B1 | 7/2001 | Shteynberg | | |
| 6,501,390 B1 | 12/2002 | Chainer et al. | | |
| 7,212,955 B2 * | 5/2007 | Kirshenbaum et al. | | 702/187 |
| 7,267,250 B2 * | 9/2007 | Rudduck et al. | | 222/270 |
| 7,334,516 B2 | 2/2008 | Ho et al. | | |
| 7,450,017 B2 | 11/2008 | Staples | | |
| 7,495,558 B2 * | 2/2009 | Pope et al. | | 340/572.1 |
| 7,864,053 B2 * | 1/2011 | August et al. | | 340/572.1 |
| 8,022,832 B2 * | 9/2011 | Vogt et al. | | 340/588 |
| 2001/0040911 A1 | 11/2001 | Rubenstein | | |
| 2002/0191673 A1 | 12/2002 | Lee | | |
| 2004/0085225 A1 | 5/2004 | Wilson | | |
| 2006/0026971 A1 * | 2/2006 | Sharpe | | 62/126 |
| 2007/0053407 A1 | 3/2007 | Kinsler | | |
| 2007/0191983 A1 * | 8/2007 | Griffits et al. | | 700/213 |
| 2007/0284333 A1 | 12/2007 | Dunnigan | | |
| 2008/0272916 A1 * | 11/2008 | Breysse et al. | | 340/572.8 |
| 2008/0314861 A1 | 12/2008 | Goldburt | | |
| 2011/0143000 A1 * | 6/2011 | Fiset | | 426/248 |

OTHER PUBLICATIONS

Non-final Office Action dated Apr. 10, 2013 for U.S. Appl. No. 13/196,847.
"Serialio, ""Mobile Barcode & RFID Solutions""", Jun. 16, 2011, 2 pages url: http://www.serialio.com/".
"ParkSense, Product Overview, Sep. 21, 2008, 1 page url: http://www.paksense.com/index.php?option=com_content&task=view&id=7&Itemid=6".

(Continued)

*Primary Examiner* — Eric M Blount
(74) *Attorney, Agent, or Firm* — Vista IP Law Group, LLP

(57) ABSTRACT

Disclosed is an improved method, system, and mechanism for a reader mechanism for a container-based approach for monitoring the history and/or quality of a consumable product. According to one approach, a monitoring mechanism is affixed to a wine container (e.g., a wine bottle) to monitor the handling/storage history and/or the drinkability of the wine inside the container. One or more environmental sensors are associated with the monitoring mechanism which tracks environmental conditions that may affect the wine. The tracked environmental conditions are analyzed to determine and/or indicate the drinkability of the wine. A reader mechanism is used to access and/or control the monitoring mechanism.

49 Claims, 13 Drawing Sheets

(56) References Cited

OTHER PUBLICATIONS

Laurent Fintoni "A case of smart wine", global identification, The reference media for auto ID, Special Report on Anti Counterfeiting, Oct. 2008, 3 pages.

Final Office Action dated Oct. 11, 2013 for U.S. Appl. No. 13/196,847.
Non-final Office Action dated Feb. 25, 2014 for U.S. Appl. No. 13/196,847.

* cited by examiner

| Device ID 602 | Calibration Data 604 | Age Table 606 | Phase Time 608 | Phase Indicator Strategy 610 | Start Tracking Time 612 | High Temperature Conditions 614 |

Personalization Data 600

Figure 6B

| Current Temperature 652 | Min/Max Temperature 654 | Time (Elapsed or real date) 656 | Maturity (effective age) 658 | Battery level 660 | Cumulative temperature 662 | High temperature time 664 |

Status Data 650

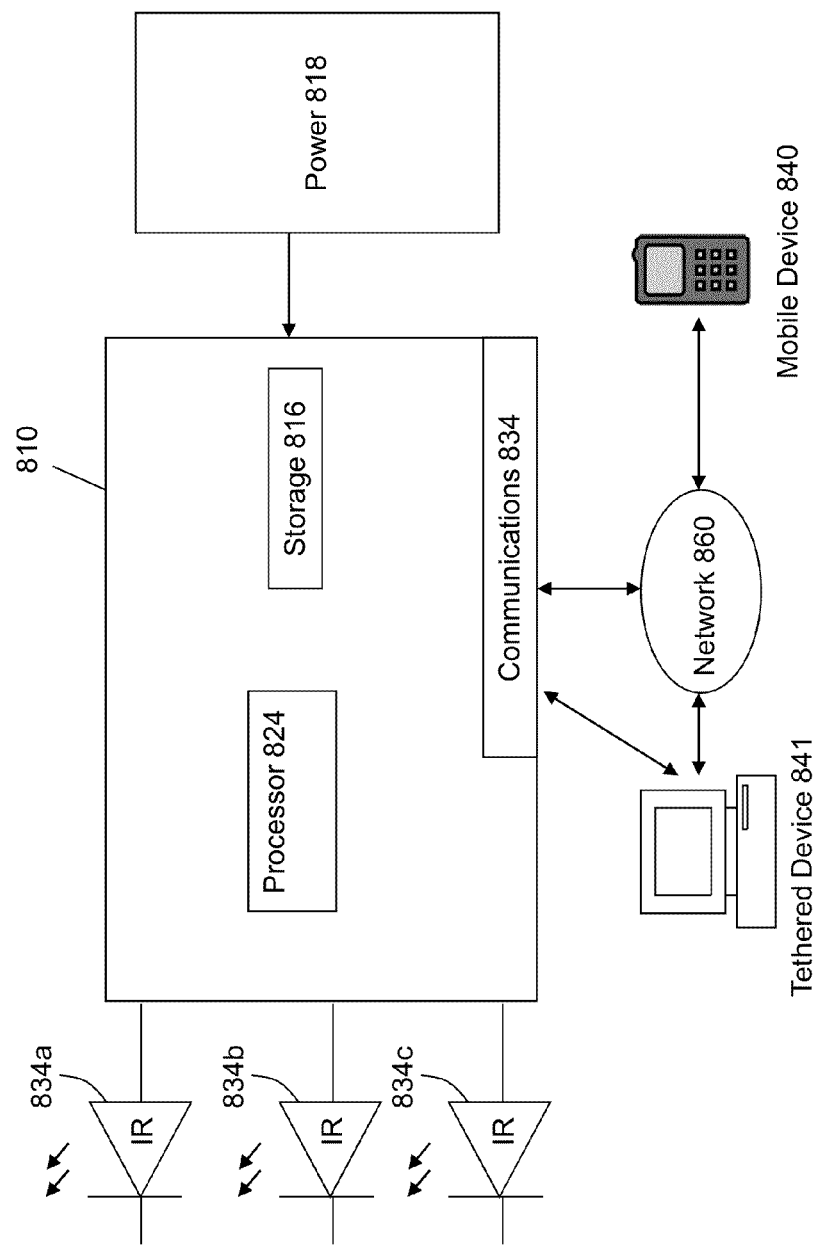

MECHANISM AND METHOD TO IMPLEMENT A READER MECHANISM FOR A CONTAINER-BASED MONITOR OF A CONSUMABLE PRODUCT

CROSS-REFERENCE TO RELATED APPLICATIONS

The present application is related to co-pending U.S. application Ser. No. 13/196,847, filed on even date herewith, which is hereby incorporated by reference in its entirety.

BACKGROUND

There are many types of consumable products that need to be properly handled and stored in order to maintain the suitability or consumability of those products. Improper handling or storage of many types of food, drink, or medicinal items may cause excessive spoilage, aging or even chemical changes that may result in dangerous side effects if consumed. The problem is that it is almost impossible for a typical consumer or purchaser of a consumable product to know the entire history of an item that has been purchased from a store shelf, and whether or not that item has suffered from improper shipping, handling, or storage conditions prior to being placed on the store shelf or while in the owner's care.

For example, consider the consumer that seeks to purchase a bottle of wine from a wine vendor. Wine is a type of alcoholic beverage that is made from a fermentation process involving various types of grapes or other fruits. The wine that is typically purchased by a consumer in a store is usually stored and sealed within glass bottles, which is traditionally sealed with a cork. There are many types and levels of wines, from the relatively inexpensive to the very expensive vintages. Indeed, outstanding wine vintages from the best vineyards may sell for thousands of dollars per bottle.

Wine is a type of consumable product that is particularly susceptible to negative effects on its drinkability because of exposure to external handling or storage conditions. This is because wine in the bottle continues to change over time as a result of expected chemical changes that occur to the wine as it ages. However, the timing of the drinkability of the wine is heavily dependent upon exactly how quickly or slowly the chemical changes occur to the wine and the specific environmental circumstances that causes the changes. For example, wine that has been exposed to excessive heat conditions or drastic fluctuations in temperatures may be severely and negatively affected by those conditions.

The issue for a typical wine purchaser is that the purchaser or consumer of wine does not conventionally have any way of knowing whether a particular bottle of wine has been properly stored or handled prior to his/her purchase of that bottle of wine. Indeed, it is quite possible that the wine to be purchased by a consumer has undergone extreme conditions during shipment, storage, or handling of that wine which has severely and negatively affected the drinkability of that wine. It is literally a matter of chance for the consumer to select a bottle of wine from a store shelf and expect that wine to be in an acceptable condition. This uncertainty regarding the drinkability of the wine is particularly troublesome if the consumer is purchasing a very expensive wine product.

Even if the wine was in acceptable condition at the time of purchase, it is possible that due to its handling or storage history, that wine has been accelerated into a mature state where it needs to be immediately consumed since any further aging would cause the wine to be less drinkable. However, since the handling/storage history of the wine is unknown to the consumer, this means that the consumer may very well store that bottle of wine according to an assumed storage history, unknowingly letting the wine age beyond its optimal drinking stage.

SUMMARY

Embodiments of the present invention provide an improved method, system, and mechanism for a reader mechanism for a container-based approach for monitoring the history and/or quality of a consumable product. According to one embodiment, a monitoring mechanism is affixed to a wine container (e.g., a wine bottle) to monitor the handling/storage history and/or the drinkability of the wine inside the container. One or more environmental sensors are associated with the monitoring mechanism which tracks environmental conditions that may affect the wine. The tracked environmental conditions are analyzed to determine and/or indicate the drinkability of the wine. A reader mechanism is used to access and/or control the monitoring mechanism.

Other additional objects, features, and advantages of the invention are described in the detailed description, figures, and claims.

BRIEF DESCRIPTION OF FIGURES

FIGS. 6A and 6B shows example sets of data that may be generated or maintained for the monitoring mechanism according to some embodiments of the invention.

FIG. 8 shows a diagram of a reader/programmer device according to some embodiments of the invention.

DETAILED DESCRIPTION

Embodiments of the present invention provide an improved method, system, and mechanism for implementing a container-based approach for monitoring the history and/or quality of a consumable product, where a reader mechanism is employed in conjunction with a monitoring mechanism. For the purposes of illustration, the following description is made in the context of wines and wine bottles. It is noted, however, that the invention may be applied to other types of consumable products and containers, and is not to be limited to wines and wine bottles unless explicitly claimed as such.

According to some embodiments of the invention, a monitoring mechanism is affixed or integrally formed onto or into a wine container (e.g., a wine bottle) to monitor the handling/storage history and/or the drinkability of the wine inside the container. One or more environmental sensors are associated with the monitoring mechanism which tracks environmental conditions that may affect the wine. The tracked environmental conditions are analyzed to determine the drinkability of the wine. Since environmental conditions affect the maturity level of wine, monitoring the one or more environmental conditions will help determine the drinkability status of that wine.

Figure 1A:
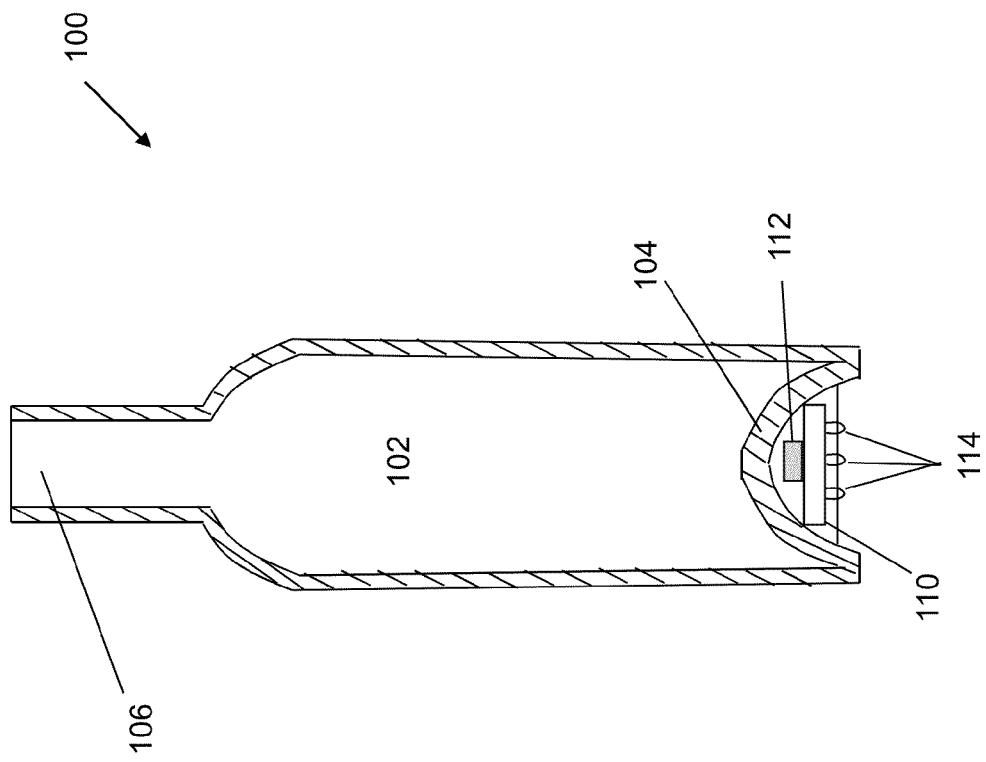
FIG. 1A illustrates a cross-sectional view of a wine bottle to which is affixed a monitoring mechanism according to some embodiments of the invention.

FIG. 1A shows a cross-sectional view of an example wine bottle 100 that includes a monitoring mechanism 110. The wine bottle 100 includes an opening 106 at which a cork is inserted to seal wine within the wine bottle 100. The interior 102 of the wine bottle 100 is used to hold the wine. The wine bottle 100 may also include a punt 104, which is normally shaped as a concave open area at the bottom of the wine bottle 100.

A monitoring mechanism 110 is associated with the wine bottle 100. The monitoring mechanism 110 comprises one or more environmental sensors 112 to measure environmental conditions that exist at the wine bottle 100. For example, one type of environmental sensor that may be used with the invention is a temperature sensor to measure the temperature at the wine bottle 100.

Figure 1B:
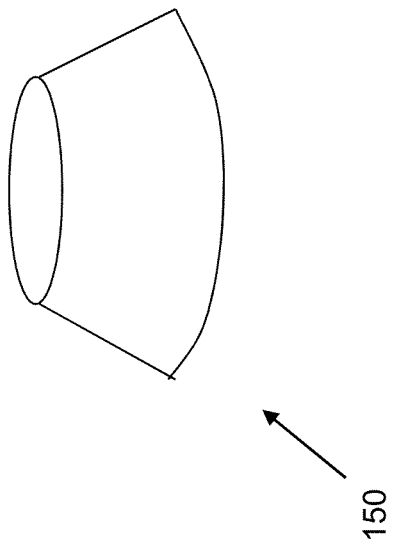
FIG. 1B depicts an enclosure shape that can be used to hold a monitoring mechanism according to some embodiments of the invention.

According to one embodiment of the invention, the monitoring mechanism 110 is an external device that is affixed to the wine bottle 100. The monitoring mechanism 110 may be formed or included within an enclosure material that is affixed to the wine bottle 100. The enclosure may be formed into any suitable shape or configuration to suit the position and/or location at which it is affixed to the wine bottle 100. For example, as shown in FIG. 1B, the enclosure may be shaped having angled sides to fit in the space within the punt 104 of the wine bottle 100.

The enclosure 150 may be any composed of any suitable material that allows for the monitoring mechanism to work effectively. For example, the enclosure 150 in some embodiments may be composed of a clear plastic or glass material. Any suitable type of bonding or adhesive material may be used to attach the enclosure 150 to the wine bottle 100.

In an alternate embodiment, the monitoring mechanism 110 is integrally formed to the wine bottle 100, rather than being constructed as an external device that is affixed to the wine bottle 100. In other embodiments, the monitoring mechanism 110 is attached to other areas of the wine bottle. For example, the monitoring mechanism 110 may be attached to or formed as part of a non-cork sealing product (such as a cap or plastic plug) that is inserted into the opening 106 to seal the wine bottle 100. The monitoring mechanism 110 may also be affixed to or formed as part of other parts of the wine bottle 100, such as a visible portion of the side of the wine bottle near the bottle label.

The monitoring mechanism 110 uses the environmental sensor 112 to periodically measure the environmental conditions at, around, and/or within the wine bottle 100. Analysis is performed using the data generated from the environmental sensor 112 to determine the effect of the environmental conditions upon the wine that is stored within the wine bottle 100.

A display mechanism can be used to display information that is recorded and/or generated by the monitoring mechanism 110. For example, one or more colored lights 114 may be included on the status monitor 110 to display information to the potential purchaser or consumer of the wine bottle 100. The colored lights 114 may include different light colors or display patterns to indicate the condition of the wine within wine bottle 100. As an example, a green light may be used to indicate that the wine is in an acceptable condition while a red light may be used to indicate that the wine has undergone historical environmental conditions that negatively affect the drinkability of that wine.

As noted above, one or more environmental conditions are measured by the monitoring mechanism 110, and those tracked environmental conditions are used to determine drinkability of the wine within the wine bottle 100. The general idea is that the drinkability of wine is directly relative to the maturity level of that wine, and that the external environmental conditions could cause chemical reactions to the wine which affect the aging or maturity level of that wine. Therefore, the "effective age" of wine may be different from the real calendar age of the wine, and is a possible determinative factor in understanding the drinkability of that wine.

Figure 2:
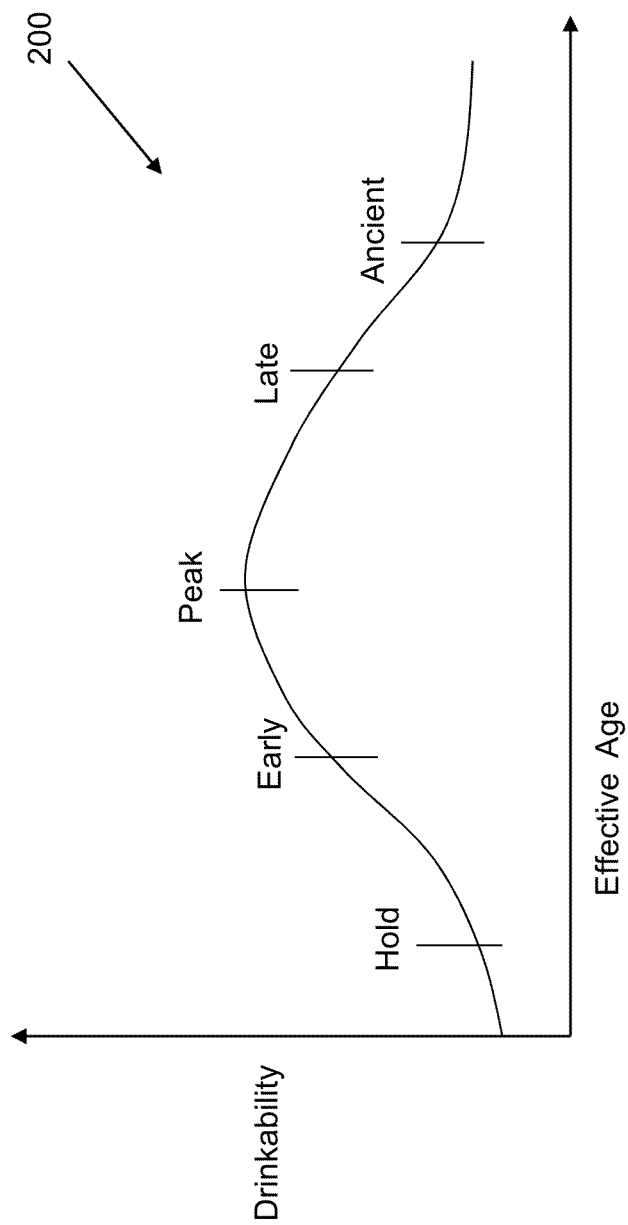
FIG. 2 illustrates an example drinkability chart according to some embodiments of the invention.

FIG. 2 depicts a chart 200 that shows an example drinkability chart for a given type of wine according to some embodiments of the invention. The chart 200 illustrates the concept that as a bottle of wine ages, it undergoes a transformation in its chemical compositions which affects its drinkability. During the early stages of the wine, it is understood to be in a "hold" phase at which the wine is considered to be premature for optimal taste. After a period of time, the wine enters the "early" phase at which the wine is considered drinkable, but still not yet at its optimal drinking stage. The wine will eventually hit its "peak" drinkability period, which is considered the optimal period of the wine's maturity level to drink the wine. As the wine ages even more, it will actually decline in its drinking quality, and will enter a "late" stage of its life. The wine will eventually reach an "ancient" stage which is considered a period at which the wine is no longer normally considered to be in a suitable drinking stage. A winemaker can build a projection of the changes in the wine, and the periods at which these phase transitions may occur based on several factors, such as the grapes themselves, the process used to make the wine, the growing and harvest conditions, and/or other relevant factors. The changes would be based on assumptions of post bottling environmental conditions. By including this insight into the device, these projections can be modified based on actual conditions the bottle is subject to and an "effective age" can be established. While FIG. 2 depicts a chart having specific examples of certain stages of drinkability for wine, it is noted that other types, names, and numbers of stages may also be used in conjunction with the invention. For example, chart 200 may also include another stage called the "fading" stage to indicate that the wine has approached an effective age where it is beginning to fade in its drinkability.

The chart 200 maps the drinkability of the wine to an effective age, which is different from the actual calendar age of the wine. The embodiments of the invention operate by understanding that the effective age of wine can be calculated by knowing about the external environmental conditions to which the wine bottle (and by extension the wine inside the bottle) has been exposed. In general, more extreme storage or handling conditions will either accelerate or decelerate the maturation of the wine, and will hence change the effective age of the wine. In general, greater heat conditions will increase the effective age of the wine while colder conditions will slow the aging of the wine. To facilitate an explanation of embodiments of the invention, this disclosure will be generally directed at example situations in which extremes of environmental conditions from heat conditions causes accelerated aging/maturation of wine. It is noted, however, that disclosure may also be applied to address the effects of colder conditions as well.

Figure 3:
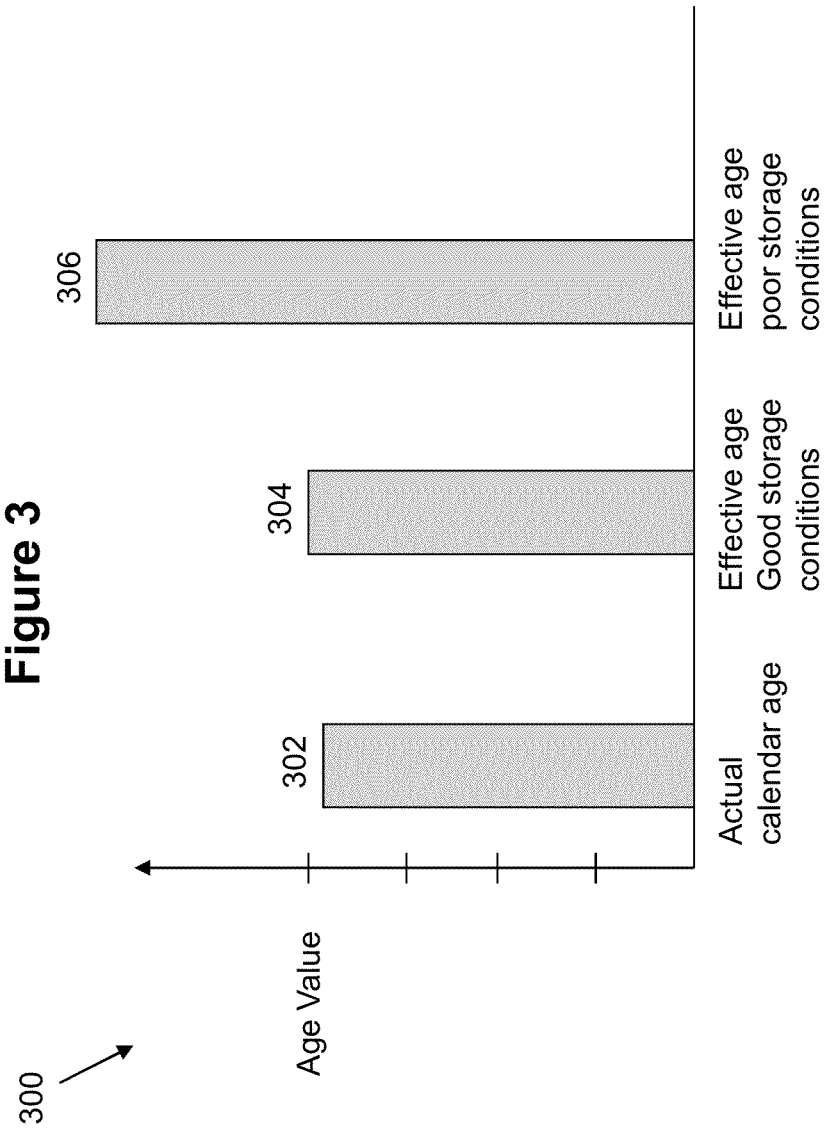
FIG. 3 illustrates a chart of effective ages for wine according to some embodiments of the invention.

The chart 300 of FIG. 3 conceptually illustrates the effects on a wine's effective age from different storage/handling conditions. The chart 300 includes a bar 302 that shows the actual calendar age of a bottle of wine. Under good storage conditions, the effective age 304 of the wine should be fairly equivalent to the actual age of the wine. However, bar 306 shows that the effective age may be much higher for wine that has been stored in poor storage conditions (e.g., with greater extremes of heat). The effective age of wine is a value that is calculated by taking into account the different environmental conditions that have affected the wine, with greater extremes of environmental conditions causing aging/maturation of that wine.

Therefore, the drinkability of wine can be determined as a function of measure environmental effects. Guidelines, e.g., aging/drinkability charts and guidelines from winemakers, may also be employed to determine the drinkability of wine. The effective age of the wine may also be utilized to determine drinkability of wine, where the effective age is derived as a function of measured environmental conditions and/or aging guidelines.

Figure 4:
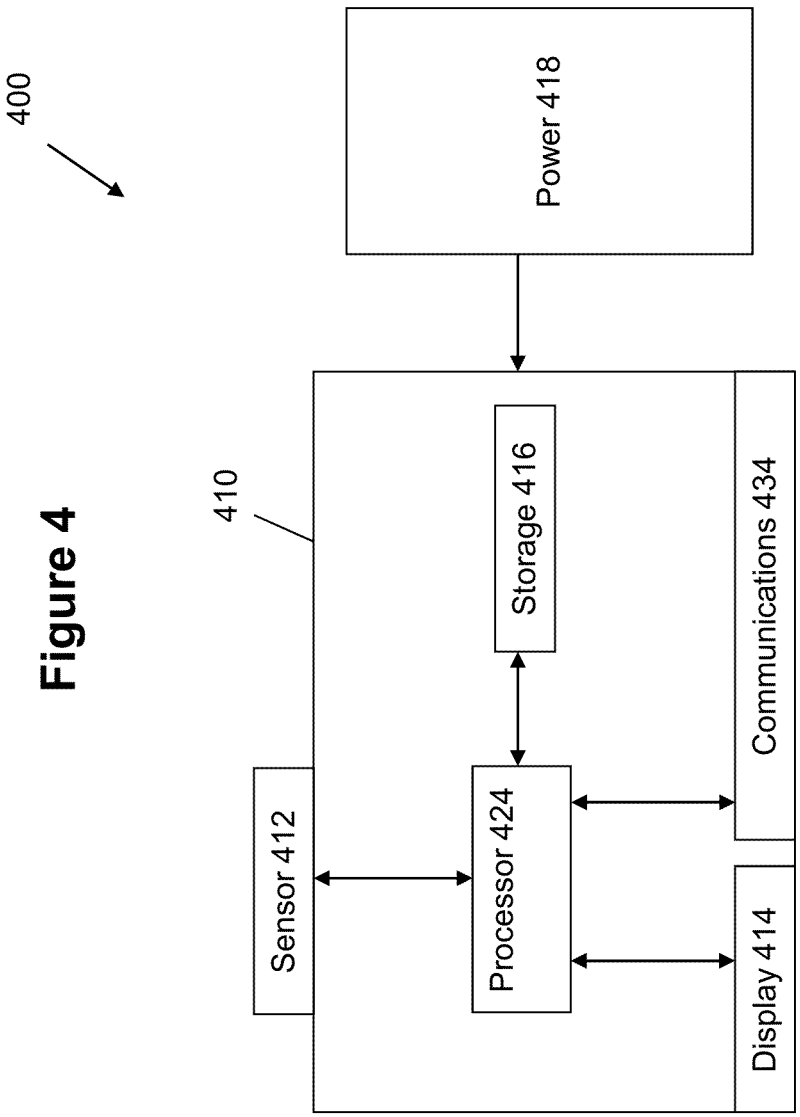
FIG. 4 shows a block diagram of a monitoring mechanism according to some embodiments of the invention.

FIG. 4 shows a block diagram 400 of a monitoring mechanism 410 that can be used to track the environmental conditions for the wine bottle and to calculate an effective age for the wine. The monitoring mechanism 410 comprises a processor 424 to control and handle processing functions within the monitoring mechanism 410. Any processor that is suitable to handle the tasks of controlling the monitoring mechanism 410 and performing effective age calculations for wine may be selected for processor 424. Processor 424 may be implemented as any type of logic, including for example, a dedicated processor IC chip or a portion of logic on a larger system or chip.

The monitoring mechanism includes a storage mechanism 416 to hold data collected or generated by the monitoring mechanism 410. Any type of storage mechanism 416 may be utilized. For example, storage mechanism 416 may be implemented as memory, e.g., flash memory, RAM, ROM, registers, flip-flops, or generally any mechanism that is capable of holding state.

One or more display mechanisms 414 are used to display information from the monitoring mechanism 410. The display mechanism 414 may be used to display the historical environmental information that has been tracked by the monitoring mechanism. The display mechanism 414 may also be used to display information about the drinkability of the wine that has been calculated by the processor 424. Display mechanism 414 may be implemented using any suitable type of display technology. For example, display mechanism 414 in some embodiments is implemented as a set of colored lights, where the color or pattern of the light display provides information about the drinkability of the wine. In an alternate embodiment, display mechanism is implemented using an LCD display panel, where the characters on the LCD display provide the desired information to the wine consumer. Therefore, any optical indicator may be used to implement the display mechanisms 414, such as a light, LED device, oLED device, LCD device, or electronic paper.

Monitoring mechanism 410 includes a communications interface 434. The communications interface 434 is used to communicate with an external device, such as an external reading or programming device that is employed to read data from storage 416 or to reprogram the monitoring mechanism 410. Any suitable wired or wireless communications mechanism may be used to implement communications interface 434.

Power supply 418 is used to provide power to the monitoring mechanism 410. In some embodiments, a battery is employed as power supply 418.

Different types of sensors 412 can be used with the monitoring mechanism 410 to track different types of environmental conditions that may affect the maturity level of the wine.

For example, one type of environmental condition that may be monitored by the monitoring mechanism 410 is the temperature condition. High temperature levels are more likely to accelerate the aging of wine, and fluctuations in temperature and/or period of extremely high temperatures are more likely to negatively affect the condition of the wine. Therefore, a temperature/heat sensor may be used with monitoring mechanism 410 to monitor temperature conditions. The temperature measurements are used to adjust the effective age of the wine, which is then used to track the drinkability of the wine. In addition, the temperature readings can be used to identify excessive temperature fluctuations and/or period of extremely high temperature exposures.

Another environmental factor that may affect the quality of the wine is light exposure. Many modern wine bottles have ultraviolet filters built into the wine bottle material that protects the contents from some or all of most of the effects of UV rays. However, long term storage in a location that uses certain types of lights (e.g., certain fluorescent lights) may still allow enough UV rays into the bottle to create a condition in the wine that is referred to as 'light struck', which negatively affects the taste of the wine. This is especially noticeable in delicate white wines and sparkling wines. Therefore, a light sensor can be used in conjunction with the monitoring mechanism 410 to track the light exposure levels of the wine bottle. The processor can be programmed to track the amount of light exposure for the wine, and to indicate warnings if the wine reaches certain threshold conditions of extreme light exposure. This warning level can be adjusted for different types of wines, bottles, and/or light. For example, the monitoring mechanisms for delicate white wines and sparkling wines may be programmed to have a lower warning threshold level than levels for other types of wines.

Yet another environmental condition that may affect wine is the humidity of the surrounding storage or transportation location of the wine. Higher humidity levels may be important because it keeps the corks from drying and minimizes evaporation. However, excessively high levels of humidity may also promote the growth of mold on the exterior of the wine bottle or the loosening of labels that have water soluble glue. A humidity sensor may be utilized with the monitoring mechanism 410 to track humidity conditions, so a warning can be issued on the indicator lights if the wine bottle is exposed to conditions sufficient to cause the cork to excessively dry out.

The storage position of the wine bottle is also a possible indicator of whether the cork is in danger of being in an excessively dry condition. For long term storage, the wine bottle should be oriented with the cork-end slightly downwards so that the wine itself inside the bottle is used to maintain sufficient moisture levels for the cork. A position sensor (e.g., an accelerometer) can be employed to track the storage position/orientation of the wine bottle. If the wine bottle is placed in long term storage in an upright position, then the position sensor will detect this situation, and hence a warning can be issued on the indicator lights of this possible problem.

In addition, it is possible that excessive vibrations one the wine bottle could negatively affect the drinkability of wine. Such vibrations could be caused during transport of the wine from one location to another. In addition, such vibrations may be caused by pumps, motors or generators of the refrigeration mechanism that are used to store the wine. A vibration sensor (e.g., an accelerometer) may be used to monitor for excessive vibrations that may affect the wine. For example, if the accelerometer detects excessive shaking during transportation of the wine bottle, then an indicator signal pattern can be provided to advise the consumer to wait a sufficient amount of time before consuming the wine until this type of "bottle shock" has worn off.

Another environmental factor that may affect the quality of the wine is whether the wine is stored with strong odors near the wine. It is possible for certain wines or wine container to pick up the aromas of items stored nearby. An odor measurement sensor may be employed with the monitoring mechanism 410 to check for conditions of strings odors in the surrounding storage locations.

Figure 5:
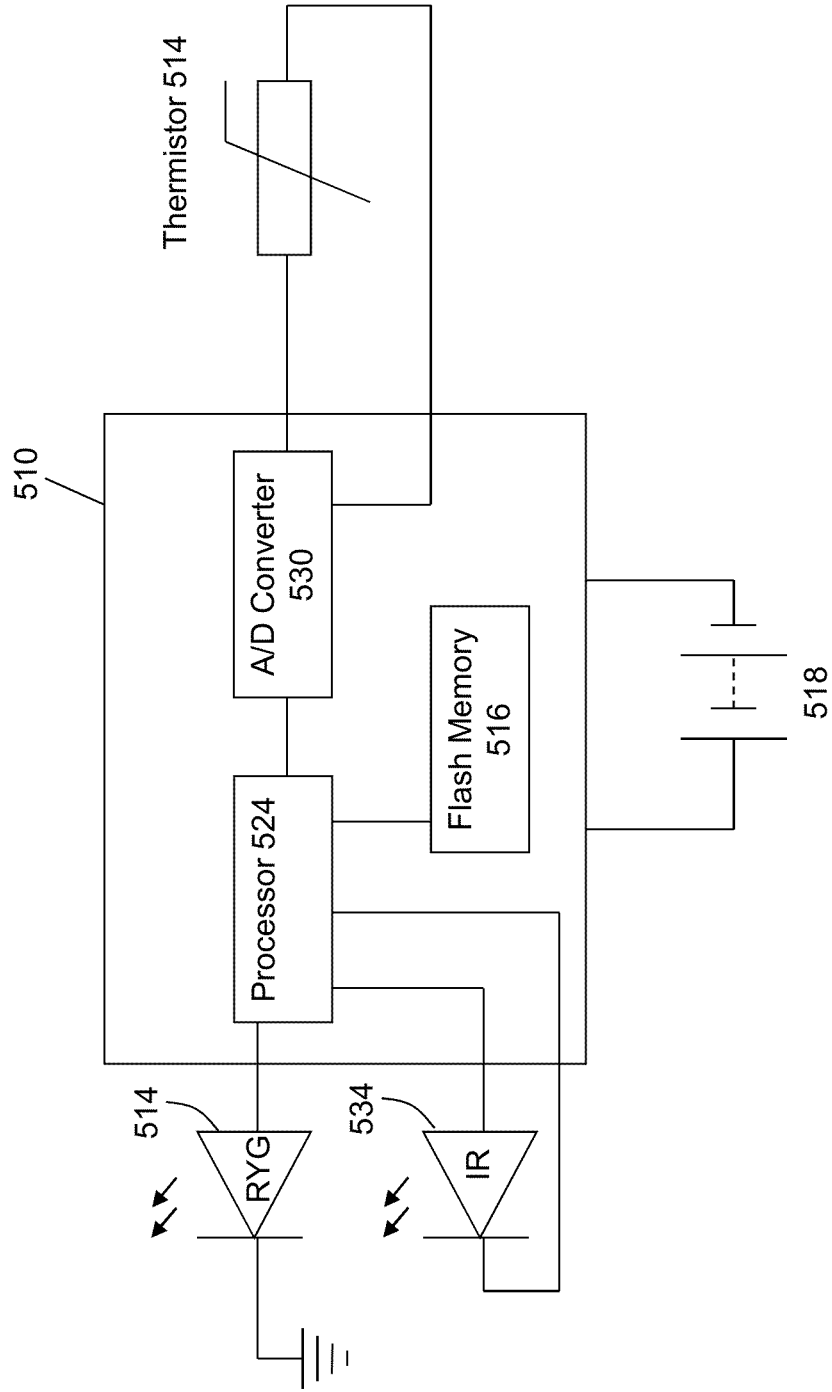
FIG. 5 shows example circuitry for a monitoring mechanism according to some embodiments of the invention.

FIG. 5 illustrates example circuitry 500 that may be used in some embodiments to implement a monitoring mechanism 510. This embodiment only includes a temperature sensor, although as noted above, other types of environmental sensors may also be used in embodiments of the invention. The temperature sensor implemented in this example monitoring mechanism 510 is a thermistor 514. A thermistor operates by having a resistance that changes as a factor of the temperature. An analog-to-digital converter 330 is employed to generate temperature readings from the different resistance levels within the thermistor 514. A battery 518 provides power to the monitoring mechanism 510.

The monitoring mechanism 514 includes a number of LED lights 514 to act as indicator lights. In some embodiments, there are three LED lights 514, with each light having a different color. The different colors (e.g., red, yellow, and green), and different possible display patterns for those colored lights, provide information to the consumer such as indications for the drinkability of the wine within the wine bottle.

Communications to and from the monitoring mechanism 510 is implemented using an infrared LED light 534. An external reader mechanism would include one or more matching infrared LED lights to communicate with IR LED light 534.

The monitoring mechanism 510 comprises a processor 524 that operates and controls the functioning of the monitoring mechanism 510. Temperature and control data are stored within flash memory 518.

Various types of data are tracked and maintained in the flash memory 516 of the monitoring mechanism. FIG. 6A shows personalization data 600 that may be generated for a given wine bottle/monitoring mechanism. The personalization data 600 is the control data that is personalized for the monitoring mechanism, and may therefore differ from one wine bottle to another wine bottle.

A device ID 602 may be associated with the monitoring mechanism, and hence is associated with the wine bottle/wine attached to the monitoring mechanism. The device ID is a unique identifier number, and every monitoring mechanism/ wine bottle is associated with its own unique identifier value.

The calibration data 604 relates to calibration that is specific for the sensor used on the monitoring mechanism. Certain types of environmental sensors may need to be calibrated to provide accurate data readings. For example, due to possible manufacturing variations, the temperatures readings from a given thermistor may need to undergo calibration to ensure that it accurately and consistently measures temperature levels. The factory that produces the thermistor and/or the monitoring mechanism may test the thermistor to check if it requires calibration, and if so, may generate calibration data 604 to normalize the temperature readings from the thermistor to accurate temperature values.

The age table 606 provides data that converts heat readings from the environmental sensor into adjustments to the effective age of the wine. For example, the age table may be implemented as a lookup table that translates heat readings from a temperature sensor into age values. If there are multiple types of sensors, weightings may be applied to adjust for multiple sensor values into a single effective age for the wine. Different types of wines and environmental sensor may be associated with different age tables. For example, it is possible in some embodiments for the age table for a red wine to differ from the age table for a white wine.

The phase table 608 maps the effective age of the wine into the different drinkability phases. The phase table 608 may be implemented using an equivalent set of data to the example drinkability chart 200 shown in FIG. 2. The wine producer may customize a phase table 608 for different types of wines being produced by the winery, based at least in part on the winery's understanding and historical experience with how its wine age under certain conditions. The phase indicator strategy 610 identifies the manner in which drinkability phase information is displayed using the indicator lights.

The start tracking time 612 identifies the start period at which monitoring ensures using the monitoring device, e.g., when the monitoring device is affixed to the wine bottle. Since the monitoring mechanism may be mass produced in a factory and only later affixed to a wine bottle filled with wine, this start tracking time 612 is used to make sure the tracking period for the wine actually begins at the correct time period.

The high temperature conditions 614 identify temperatures which are considered "high temperature" for purposes of performing certain types of analysis. For example, this type of data can be used to check for excessive temperatures levels that are expected to negatively affect the wine within the wine bottle. In addition, this data can be used to increment a score to account for cumulative effective of high temperatures over the life of the wine, e.g., by incrementing a score by certain amounts depending upon measured levels of high temperatures, where higher temperatures cause greater increment amounts than lower temperatures. The incremented high temperature score(s) can then be used to indicate different care and alarm conditions by the device, the mobile device, tethered device, and/or the reader. The temperature data can also be used to control the indicator lights on the device (and/or the reader device) to indicate that the wine is currently at a correct or recommended temperature for consumption, where the analysis of the proper temperature may be based at least in part upon the wine's effective age and not a static temperature value.

Any or all of the personalization data 600 may be locked to prevent tampering of the monitoring data. This locking may be implemented using any suitable technique. For example, a fuse can be blown on the monitoring device to lock the personalization data 600. This provides assurances to the potential purchaser or consumer that the personalization data 600 for the wine bottle is accurate and cannot be improperly altered or re-programmed. This prevents, for example, unscrupulous vendors from reprogramming the age table to fraudulently identify an excessive mature wine as being in an earlier phase of its maturity level.

FIG. 6B shows status data 650 that may be tracked during operation of the monitoring device. The current temperature 652 reflects the actual temperature currently being measured by the monitoring device. The min/max temperature 654 tracks the lowest and highest temperatures that have been measured during the life of the monitoring device.

The time 656 tracks the elapsed time since the monitoring device began its operation. This value may be stored as an elapsed time value. This value may also be implemented by tracking the current time/date, and deriving the elapsed time using the start time 612 from the personalization data 600. The maturity value 658 is the current effective age that has been calculated from the historical temperature readings from the monitoring mechanism.

The battery level 660 tracks the power/voltage levels in the battery that is being used to power the monitoring mechanism. The cumulative temperature 662 records a cumulative temperature value for the monitoring device. An average temperature can be derived using this value and the elapsed time 656.

A high temperature time 664 is also tracked for the wine bottle. A time is recorded at which a predetermined criterion is met for a cumulative high temperature condition. In an alternative embodiment, this value stores and identifies the highest temperature condition that has been experienced in the history of the wine/wine bottle. In some embodiments, a set of high temperature times are stored for a number of high temperature ranges/events.

Figure 7A:
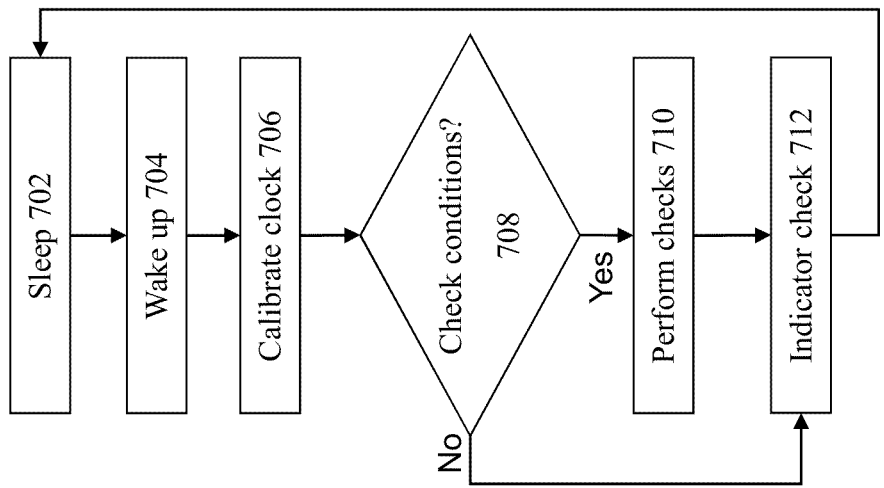
FIG. 7A shows a flowchart of an approach for operating the monitoring mechanism according to some embodiments of the invention.

FIG. 7A shows a flowchart of an approach for operating the monitoring mechanism. At 702, the approach starts with the monitoring device in a sleep mode. To conserve battery life, most of the life of the monitoring device is spent in this sleep mode.

On a periodic basis, the monitoring device will wake up at 704. For example, a timer can be set to wake up the monitoring on an every 1 second interval. The internal clock on the monitoring device may undergo calibration at 706. The reason for this action is because certain environmental conditions (e.g., temperature conditions) may affect the accuracy of the clock. A check is performed to see if a calibration of the clock is required. If so, then calibration of the clock is performed at 706.

A determination is made at 708 whether certain status check conditions should be performed at this time. For example, the system can be configured to perform the status checks on a periodic basis, e.g., once every hour. Therefore, the check that is made at 708 determines whether an hour has elapsed since the last set of status checks. If it is now time to perform status checks, then those checks are performed at 710. More details regarding these status checks are provided below with respect to FIG. 7B.

Indicator checks are performed at 712. This action implements the indicator strategy from the personalization data, and acts to turn off or on the indicator light to indicate the drinkability phase of the wine.

Figure 7B:
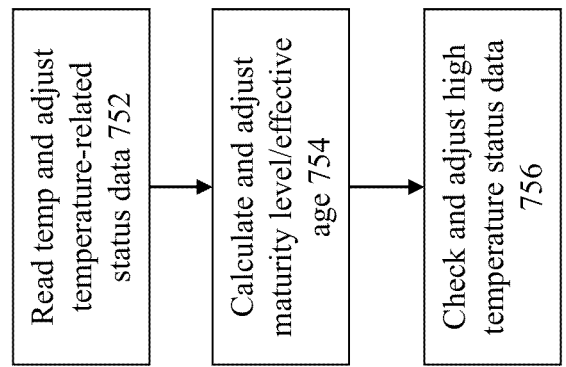
FIG. 7B shows a flowchart of status check actions according to some embodiments of the invention.

FIG. 7B shows a flowchart of several status check actions that may be performed in some embodiments of the invention. At 752, an action is performed to obtain a temperature reading from the temperature sensor, and to then adjust temperature-related status data with the updated data. For example, the current temperature 652 and the min/max temperature data 654 may be updated at this point.

At 754, the current temperature reading is used to adjust the maturity level/effective age of the wine. The new maturity value is obtained by adding the appropriate value from the age table for the current temperature to the old maturity level value. The new maturity level value is then stored into the status data 650.

At 756, a check is performed of the high temperature conditions. If appropriate, the high temperature time value 664 is adjusted to account for any high temperature conditions that have been detected.

Using the techniques described above, the effective age 658 of the wine is calculated, which can be matched against the phase time data 608 to determine the drinkability of the wine. Using the phase indicator strategy 610, the indicator lights can be controlled to display information to indicate to a potential purchaser of the wine whether or not the wine is in an acceptable condition. For example, the monitoring mechanism can be programmed to flash a red light if the wine is no longer in an acceptable condition or to flash green if the wine is an acceptable condition.

For a typical wine consumer that is seeking to purchase a bottle of wine at a store, embodiments of the invention therefore solves the problem with conventional approaches, where it difficult or impossible for the consumer to know whether the wine has been exposed to excessive handling or storage problems. For example, the wine may have been stored in excessive temperature conditions such that it is no longer drinkable.

With embodiments of the present invention, the status monitor and indicator lights now provide an easy and immediate way for the consumer to know prior to purchase whether or not the wine is still drinkable. The status display indicator can be visibly checked by the consumer to check the drinkability status of that bottle of wine. If the wine is in acceptable condition, then the display indicator will confirm this. If, however, the wine has passed its drinkability phases, then the consumer can simply choose not to purchase the wine. In this way, the wine consumer can always be made aware of the historical effects of environmental conditions that may have affected the bottle of wine.

In addition, the existing owner of wine can use embodiments of the invention know the exact right time period at which the wine is at its optimal/peak drinkability phase. This removes the guesswork from knowing when to open a bottle of wine. In addition, this approach can also be used to identify any problematic storage conditions to the owner of the wine.

While indicator lights by themselves can be used to provide very useful information, it is possible that there may be a need to obtain more detailed status or historical information from the monitoring mechanism. In addition, there may be a need to provide further programming or control information to the monitoring device, e.g., to turn off/on indicator lights to conserve battery power.

According to some embodiments, an external reader/programming device may be used to communicate with the monitoring device. FIG. 8 shows a system 800 that includes an external reader/programmer device 810. Much like the monitoring mechanism, the reader/programmer 810 comprises a processor 824 to control the operation of device 810 and a storage mechanism 816 to store data during the operation of the device 810. A power device 818, e.g., a battery, may be used to supply power to reader/programmer 810.

The reader/programmer 810 may use a communications interface 834 to communicate over a network 860 to an external device, such as a mobile device 840 or tethered device 841. Therefore, in some embodiments, communications interface 834 may use any combination of wired or wireless communications methods to communicate with the external devices. The external device, e.g., the mobile device 840, includes a display/interface device to control, send commands, and/or read data sent from the reader/programmer 810. On the mobile device, expanded information can be presented, such as more detailed interpretation of historical high temperature conditions, and/or integrating with realtime data available "on the cloud"—such as after-bottling information from the winemaker and/or other tasters.

According to the current embodiment, reader/programmer 810 includes one or more IR LED lights to communicate with the monitoring device on the wine bottle. The example in FIG. 8 shows three IR LED lights 834a, 834b, and 834c, although any number of such lights may be used in any particularly application of the invention.

Figure 10:
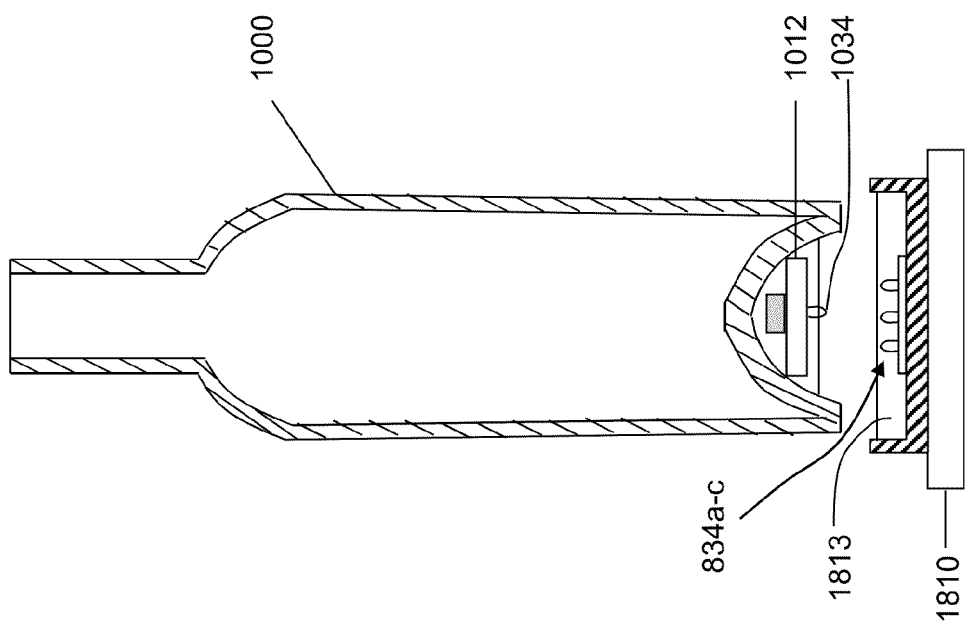
FIG. 10 illustrates a wine bottle having a monitoring mechanism and a matching reader/programmer according to some embodiments of the invention.

The reason for using multiple LEDs 834a-c to communicate with the monitoring mechanism on the wine bottle is because of possible misalignments of the communications IR LED on the wine bottle relative to the communications IR LEDs on the reader/programmer. This is illustrated in FIG. 10, which shows a wine bottle 1000 having a monitoring mechanism 1012 with a single communications IR LED 1034.

The reader/programmer 1810 may be implemented as a "base" for the wine bottle, which includes an opening portion 1813 that aligns to the bottom of wine bottle 1000. The issue is that every winery potentially uses a wine bottle having dimensions that slightly or significantly differ from the dimensions of the wine bottles used by other wineries. If the reader/programmer uses only a single communications LED, then even when the wine bottle 1000 is perfectly seated in the opening 1813 of the reader/programmer, it is possible that no two wine bottles line up exactly the same, and therefore the communications LED 1034 on the monitoring mechanism 1012 may not align properly relative to the single communications IR LED on the reader programmer. This potential misalignment between communications LEDs could result in communications failures or problems.

Figure 9B:
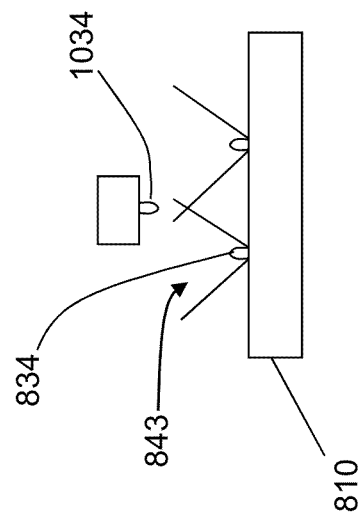
FIGS. 9A and 9B illustrate configuration of communications lights on a reader/programmer according to some embodiments of the invention.
Figure 9A:
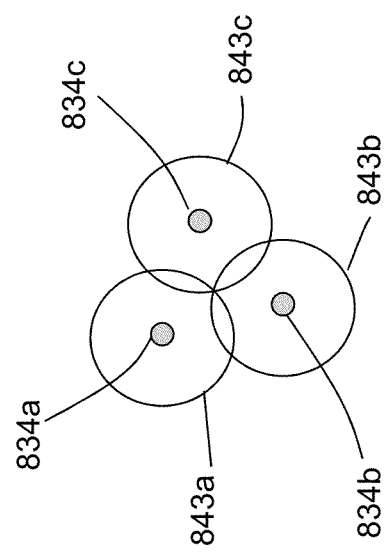

To address this issue, the reader/programmer 1810 is configured to include multiple communications IR LEDs 834a-c. As shown in FIG. 9A, each of the LEDs 834a-c corresponds to a given viewing angle 843a-c, respectively. The LEDs 834a-c are positioned such that the view angles 843a-c of the three LEDs will overlap with the range of possible positions for the IR LED 1034 on the wine bottle 1000, subject to the possible range of height differences between the different wine bottle dimensions. This approach is illustrated in FIG. 9B, which shows that the view angles 843 of the LEDs 834 on the reader/programmer cover a range of possible location for the LED 1034 on the monitoring mechanism 1034 of the wine bottle.

In operation, the reader/programmer 810 will communicate by activating the IR LEDs 834a-c on the reader/programmer 810. When the monitoring mechanism 1012 on the wine bottle 1000 is in receive mode, this will cause a relatively fast discharge to occur on the LED 1034 at the wine bottle 1000. A threshold can be set to determine the cut off discharge period to distinguish intentional communications from random light that may be captured in the receive mode. Assuming the measured discharge period falls within the established threshold, then handshaking will occur between the reader/programmer 810 and the monitoring mechanism 1012 on the wine bottle 1000. Communications can then ensue to transfer data between the two devices.

It is possible that multiple IR LEDs on the reader/programmer will be able to communicate with the IR LED on the monitoring device on the wine bottle. In one embodiment, the LED on the reader/programmer with the strongest signal will be selected to perform the communications functions. In an alternate embodiment, all the IR LEDs will be used for communications. In yet another embodiment, the "send" signal will be performed with all of the IR LEDs, but the "receive" signal will operate with just the LED having the strongest signal, or vice versa.

The reader/programmer can be used by the consumer to obtain detailed information from the monitoring mechanism on the wine bottle. In its reading mode of operation, one possible use of this device is to permit the consumer to bring a portable version of the reader device into a store to view or access detailed information from wine bottles on the store shelf. This allows the consumer to make purchasing decisions that are very much based on accurate information about the historical environmental conditions under to which the wine was previously exposed. Another possible use of the reading function is to allow the consumer to detect any problems with his/her storage conditions for the wine.

The reader/programmer can be used in a "programming" mode to implement changes or updates to the monitoring device or to the drinkability analysis. For example, the reader/programmer can be used to change the display indicator functions on the monitoring device, e.g., to conserve battery life.

As another example, assume that the actual consumer experience with a given type of wine causes a winery to change its estimate of values for the drinkability phase table 608. The problem is that this data may have already been locked. To address this situation, the reader/programmer device may be employed to access the effective age data, and to re-interpret the drinkability of the wine in a way that is different from the data in the phase table 608.

Therefore, what has been described is an advanced and novel approach for monitoring consumable products. The above embodiment was provided relative to monitoring of wine and wine bottles. However, the invention can be applied to monitor environmental conditions for any type of consumable products or product containers, such as for any medicinal, food, or drink products.

In the foregoing description, numerous details are set forth for purpose of explanation. However, one of ordinary skill in the art will realize that various embodiments can be practiced without the use of these specific details. In other instances, well known structures and devices are shown in block diagram form in order to not obscure the description with unnecessary detail.

The invention claimed is:

1. A reader device, comprising:
    a communications mechanism to communicate with a monitoring device, in which the communications mechanism comprises multiple lights having overlapping viewing angles, and wherein the monitoring device is integral to or affixed to a wine container; and
    a processor to control activities of the reader device.

2. The reader device of claim 1 in where the reader device is formed as part of a base on which the wine container is placed.

3. The reader device of claim 2,
    wherein the base aligns the communications mechanism on the reader device to a second communications mechanism on the monitoring device.

4. The reader device of claim 3 in which the communications mechanism on the reader device and the second communications mechanism on the monitoring device uses optical communications, wherein the second communications mechanism comprises one or more lights, and alignment is performed by aligning the lights.

5. The reader device of claim 4 in which the lights of the communications mechanism and second communication mechanism comprise one or more IR lights.

6. The reader device of claim 3 in which the wine container comprises a wine bottle.

7. The reader device of claim 1, in which the reader device is formed as part of a base, wherein the base includes an opening into which a bottom portion of the wine bottle sits upon, and the monitoring device resides within a punt of the wine bottle.

8. The reader device of claim 1, in which the reader device is formed as part of a base, wherein the base includes an opening into which a top portion of the wine bottle sits upon, and the monitoring device resides on or in a capsule, cork or the shoulder of the wine bottle.

9. The reader device of claim 1 in which the one or more lights comprise IR lights.

10. The reader device of claim 3 which is configured to program instructions to the monitoring device.

11. The reader device of claim 3 which is configured to read status information from the monitoring device.

12. The reader device of claim 3 further comprising a memory to hold data obtained from the monitoring device.

13. The reader device of claim 3 further comprising a communications interface to communicate with an external user device.

14. The reader device of claim 13 in which the external user device comprises a mobile device or a tethered device.

15. The reader device of claim 13 in which the communications interface comprises a wireless communications interface.

16. The reader device of claim 1, further comprising:
a display mechanism which includes an indicator device.

17. The reader device of claim 16 in which the indicator device comprises an optical indicator having at least one of a light, LED device, oLED, or LCD device, or electronic paper.

18. The reader device of claim 17 in which the optical indicator is displayable in different patterns or colors to indicate status information about wine in the wine bottle or about the monitoring device.

19. The reader device of claim 4 in which the one or more lights comprise multiple lights having overlapping viewing angles.

20. The reader device of claim 3, further comprising a display mechanism which includes an indicator device.

21. The reader device of claim 7 in which the base aligns the communications mechanism on the reader device to a second communications mechanism on the monitoring device.

22. The reader device of claim 21 in which the communications mechanism on the reader device and the second communications mechanism on the monitoring device uses optical communications, wherein the second communications mechanism comprises one or more lights, and alignment is performed by aligning the lights.

23. The reader device of claim 7 which is configured to program instructions to the monitoring device.

24. The reader device of claim 7 which is configured to read status information from the monitoring device.

25. The reader device of claim 7 further comprising a memory to hold data obtained from the monitoring device.

26. The reader device of claim 7 further comprising a communications interface to communicate with an external user device.

27. The reader device of claim 7, further comprising a display mechanism which includes an indicator device.

28. The reader device of claim 8 in which the base aligns the communications mechanism on the reader device to a second communications mechanism on the monitoring device.

29. The reader device of claim 28 in which the communications mechanism on the reader device and the second communications mechanism on the monitoring device uses optical communications, wherein the second communications mechanism comprises one or more lights, and alignment is performed by aligning the lights.

30. The reader device of claim 8 which is configured to program instructions to the monitoring device.

31. The reader device of claim 8 which is configured to read status information from the monitoring device.

32. The reader device of claim 8 further comprising a memory to hold data obtained from the monitoring device.

33. The reader device of claim 8 further comprising a communications interface to communicate with an external user device.

34. The reader device of claim 8, further comprising a display mechanism which includes an indicator device.

35. The reader device of claim 1 in which the communications mechanism on the reader device and a second communications mechanism on the monitoring device use optical communications, wherein the second communications mechanism comprises one or more lights, and alignment is performed by aligning the lights.

36. The reader device of claim 1 in which the reader device comprises a hand-held device.

37. The reader device of claim 1 which is configured to program instructions to the monitoring device.

38. The reader device of claim 1 which is configured to read status information from the monitoring device.

39. The reader device of claim 1 further comprising a memory to hold data obtained from the monitoring device.

40. The reader device of claim 1 further comprising a communications interface to communicate with an external user device.

41. The reader device of claim 1, further comprising a display mechanism which includes an indicator device.

42. The reader device of claim 16 which is formed as part of a base on which the wine container is placed.

43. The reader device of claim 42 in which the base aligns the communications mechanism on the reader device to a second communications mechanism on the monitoring device.

44. The reader device of claim 16 in which the communications mechanism on the reader device and a second communications mechanism on the monitoring device uses optical communications, wherein the second communications mechanism comprises one or more lights, and alignment is performed by aligning the lights.

45. The reader device of claim 16 which is configured to program instructions to the monitoring device.

46. The reader device of claim 16 which is configured to read status information from the monitoring device.

47. The reader device of claim 16 further comprising a memory to hold data obtained from the monitoring device.

48. The reader device of claim 16 in which the reader device comprises a hand-held device.

49. The reader device of claim 16 further comprising a communications interface to communicate with an external user device.

* * * * *